United States Patent
Kondo

(10) Patent No.: US 8,073,089 B2
(45) Date of Patent: Dec. 6, 2011

(54) DATA PLAYER AND DATA PLAY METHOD

(75) Inventor: Kazuhiko Kondo, Gifu (JP)

(73) Assignee: Semiconductor Components Industries, LLC, Phoenix, AZ (US)

(*) Notice: Subject to any disclaimer, the term of this patent is extended or adjusted under 35 U.S.C. 154(b) by 800 days.

(21) Appl. No.: 12/047,375

(22) Filed: Mar. 13, 2008

(65) Prior Publication Data

US 2008/0226006 A1    Sep. 18, 2008

(30) Foreign Application Priority Data

Mar. 13, 2007   (JP) ................................ 2007-062758

(51) Int. Cl.
  *H04L 7/02*    (2006.01)
(52) U.S. Cl. ....................................... 375/359; 375/354
(58) Field of Classification Search .................. 375/359, 375/354
  See application file for complete search history.

(56) References Cited

U.S. PATENT DOCUMENTS

| | | | | |
|---|---|---|---|---|
| 4,317,111 A | * | 2/1982 | Masoero | 341/70 |
| 4,852,088 A | * | 7/1989 | Gulick et al. | 370/413 |
| 5,148,485 A | * | 9/1992 | Dent | 380/46 |
| 7,200,195 B2 | * | 4/2007 | Amano | 375/355 |
| 2005/0201495 A1 | | 9/2005 | Sogabe et al. | |

FOREIGN PATENT DOCUMENTS

JP    2005-259220    9/2005

* cited by examiner

*Primary Examiner* — Shuwang Liu
*Assistant Examiner* — Michael Neff
(74) *Attorney, Agent, or Firm* — Cantor Colburn LLP

(57) ABSTRACT

A synchronous pattern detection section checks coincidence between a predetermined reference synchronous pattern and a bit pattern included in a data stream. Each time a bit pattern which coincides with the reference synchronous pattern is detected, the synchronous pattern detection section extracts a frame length of a data frame corresponding to the bit pattern which is detected, and stores the extracted frame length in a storage section. Each time a bit pattern which coincides with the reference synchronous pattern is detected in the synchronous pattern detection section, a synchronization determination section determines whether or not the bit pattern detected by the synchronous pattern detection section is a correct synchronous pattern, based on a plurality of frame lengths stored in the storage section and a bit length of a data stream which is obtained after detection of the bit pattern. With this structure, a synchronous pattern included in the data stream can be detected with higher precision.

5 Claims, 4 Drawing Sheets ing the synchronization setting signal, decodes the data stream input from the synchronous pattern detection section 12 for each frame length stored in the register 14, in synchronization with the synchronous timing.

In another conventional data player and a control method thereof, a data stream which is compression-encoded at a variable bit rate including a variable length is played while minimizing the noise made by a fake synchronous signal.

In this technology, a stream type counter which counts stream type information output from a header information analyzer and a stream type judgment section which instructs the start of stream conversion to a signal processing section on the basis of the value of the stream type counter are mounted in a synchronous signal detection section. When the counter value of the stream type counter reaches a predetermined value, it is judged that an input signal is a stream signal. When the value of the stream type counter does not reach the predetermined value, detection of a synchronous signal is restarted from an address which is advanced by one bit from the address stored in a synchronous address storage section.

Here, a data stream includes a plurality of consecutive frames. When a sub frame or the like includes data having the same bit pattern as the synchronous pattern (which is set to "0xfff" in the above example), there is a possibility that the synchronous pattern detection section 12 will erroneously detect that bit pattern as a synchronous pattern. If the synchronous pattern detection section 12 detects the next synchronous pattern under such a circumstance, the frame length stored in the register 14 and the counter value of the counter 16 do not coincide with each other. This may result in a disadvantage that a long time is required to detect a correct synchronous pattern, retarding start of decoding processing of the data stream to be performed by the decoder 20.

DATA PLAYER AND DATA PLAY METHOD

PRIORITY INFORMATION

The entire disclosure of Japanese Patent Application No. 2007-062758 filed on Mar. 13, 2007 including the specification, claims, drawings, and abstract is incorporated herein by reference.

BACKGROUND

1. Technical Field

The present invention relates to a data player and a data play method in which a synchronous pattern contained in audio data or the like can be detected.

2. Related Art

As shown in FIG. 4, a conventional data player 100 includes an interface section 10, a synchronous pattern detection section 12, a register 14, a counter 16, a synchronization determination section 18, and a decoder 20. The data player 100 receives, via the interface section 10, various data including audio data such as MP3 from a memory or the like, and plays the received data.

An audio data stream is transmitted as data frames which are encoded and compressed at a predetermined bit rate. A synchronous signal composed of a bit string having a predetermined synchronous pattern is added to each frame. A frame 30 forming a data stream in an MP3 format, for example, includes a 12-bit synchronous signal 32, a 20-bit header frame 34 following the synchronous signal 32, and a sub frame 36 following the header frame 34, as shown in FIG. 5. In the case of MP3, the synchronous pattern of the synchronous signal 32 is set to "0xfff".

The header frame 34 includes information representing the frame properties such as a bit rate indicating the frame length, a frame type, a sampling frequency, emphasis information and so on.

More specifically, an audio data stream is transmitted as a bit string in which a synchronous pattern is inserted for each predetermined frame length, as shown in FIG. 6. Further, a bit string immediately after the synchronous signal indicates a frame length, i.e. a data length between adjacent synchronous patterns.

The audio data is sequentially input to the synchronous pattern detection section 12 via the interface section 10. The synchronous pattern detection section 12 supplies the data stream which is input to the decoder 20, and also detects, as a synchronous pattern, a bit string having a pattern which is equal to a reference synchronous pattern previously registered in a built-in register or the like. Then, the synchronous pattern detection section 12 detects a frame length stored immediately after the synchronous pattern and stores information concerning the detected frame length in the register 14.

After detection of a synchronous pattern, the counter 16 counts the number of bits of data until detection of the next synchronous pattern. Then, when detecting the next synchronous pattern, the synchronous pattern detection section 12 supplies a determination control signal to the synchronization determination section 18. The synchronization determination section 18, receiving the determination control signal, compares a counter value of the counter 16 at that time with the frame length stored in the register 14. If the two values appropriately coincide with each other, the synchronization determination section 18, determining that a correct synchronization timing has been detected, outputs a synchronization setting signal to the decoder 20. The decoder 20, upon receiv-

SUMMARY

In accordance with one aspect of the present invention, there is provided a data player comprising a synchronous pattern detection section that checks coincidence between a predetermined reference synchronous pattern and a bit pattern included in a data stream, and, each time a bit pattern which coincides with the reference synchronous pattern is detected, extracts a frame length of a data frame corresponding to the bit pattern which is detected, the extracted frame length being stored in a storage section, and a synchronization determination section that determines, each time a bit pattern which coincides with the reference synchronous pattern is detected, whether or not the bit pattern detected by the synchronous pattern detection section is a correct synchronous pattern, based on a plurality of frame lengths stored in the storage section and a bit length of a data stream which is obtained after detection of the bit pattern.

In accordance with another aspect of the present invention, there is provided a data play method comprising checking coincidence between a predetermined reference synchronous pattern and a bit pattern included in a data stream, and extracting, each time a bit pattern which coincides with the reference synchronous pattern is detected, a frame length of a data frame corresponding to the bit pattern which is detected and storing the extracted frame length in a storage section, and determining, each time a bit pattern which coincides with the reference synchronous pattern is detected, whether or not the bit pattern detected by the synchronous pattern detection section is a correct synchronous pattern, based on a plurality of frame lengths stored in the storage section and a bit length of a data stream which is obtained after detection of the bit pattern.

BRIEF DESCRIPTION OF THE DRAWINGS

A preferred embodiment of the present invention will be described in detail based on the following figures, wherein.

DETAILED DESCRIPTION

A preferred embodiment of the present invention will be described in detail with reference to the accompanying drawings.

Figure 1:
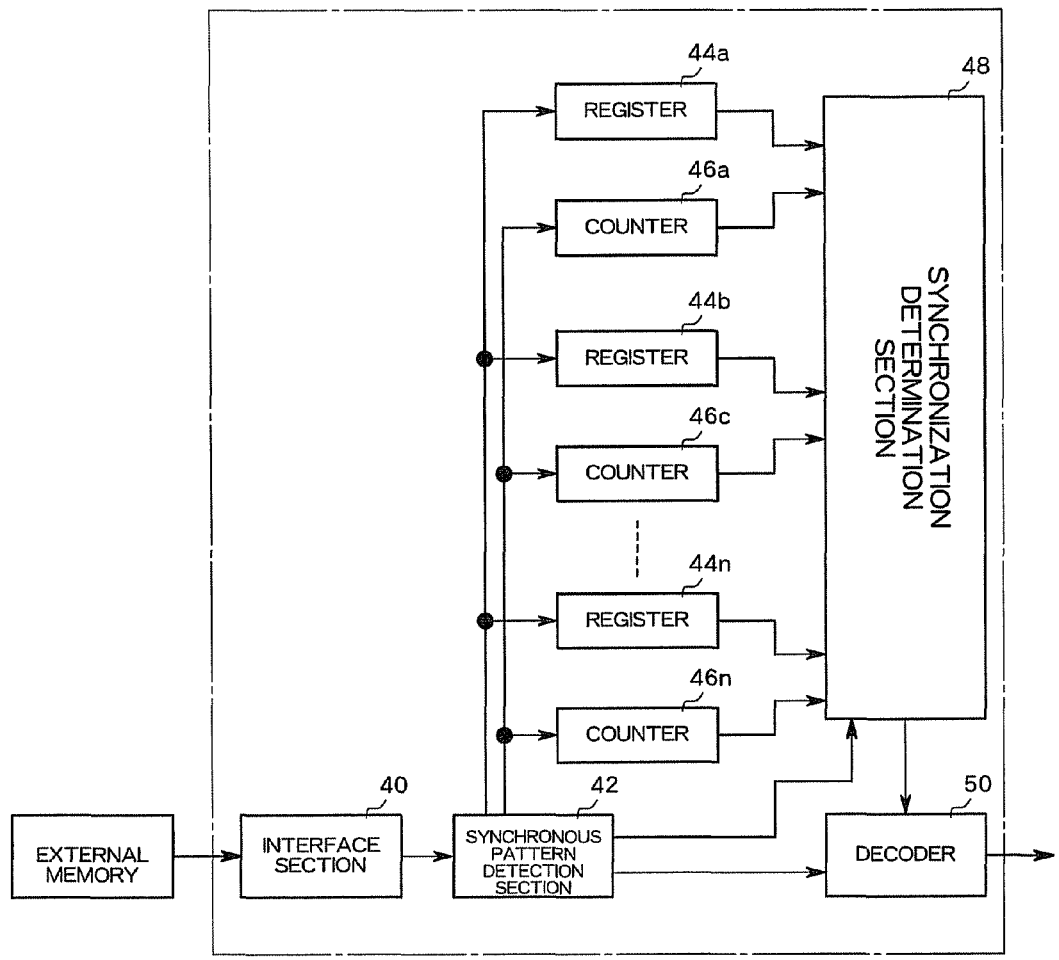
FIG. 1 is a view showing a structure of a data player according to an embodiment of the present invention.
Figure 2:
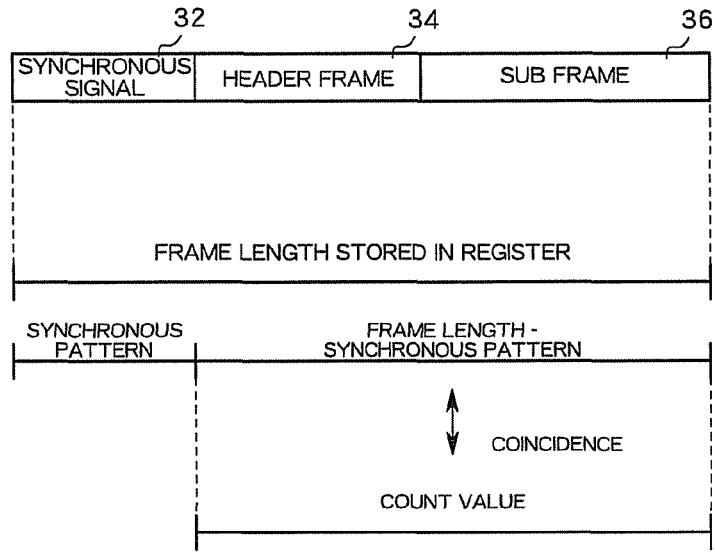
FIG. 2 is a view for explaining a synchronization determination processing according to the embodiment of the present invention.

Referring to FIG. 1, a data player 200 according to an embodiment of the present invention includes an interface section 40, a synchronous pattern detection section 42, registers 44a, 44b, . . . 44n, counters 46a, 46b, . . . 46n, a synchronization determination section 48, and a decoder 50. The data player 200 receives various data including audio data such as MP3 or the like from a memory or the like via the interface section 40, and plays the received data.

The interface section 40 is an interface which complies with the MMC (Multi Media Card) standard, and a NAND external memory such as flash memory can be mounted in the interface section 40. Here, various types of external memories including Compact Flash (registered mark), Smart Media (registered mark), SD card (registered mark), Memory Stick (registered mark), and so on can be used. Audio data or the like which is read from the external memory mounted on the interface section 40 is supplied to the synchronous pattern detection section 42 as a data stream.

Here, the interface section 40 may include a copyright protection mechanism for performing copyright protection processing which is compatible with standards such as CPRM (Content Protection for Recordable Media) and UDAC-MB (Universal Distribution with Access Control Media Base).

Further, the interface section 40 may be a network interface for receiving a data stream from a network such as the Internet, LAN, and so on. In this case, audio data or the like which is read from an external apparatus connected to the interface section 40 via the network is supplied as a data stream to the synchronous pattern detection section 42.

The synchronous pattern detection section 42, receiving the data stream input from the interface section 40, transfers the received data stream to the decoder 50. The synchronous pattern detection section 42 also detects a synchronous pattern included in the data stream. The synchronous pattern detection section 42 then outputs a reset signal to any one of the counters 46a, 46b, . . . 46n, in response to a result of detection of the synchronous pattern.

The audio data stream is transmitted as frames which are encoded and compressed at a predetermined bit rate, as described above. Each frame includes a synchronous signal 32 composed of a bit string having a predetermined synchronous pattern (which is "0xfff" in the case of MP3), a header frame 34, and a sub frame 36. Accordingly, the synchronous pattern detection section 42 detects from the data stream, as a synchronous pattern, a bit string having a bit pattern which coincides with a reference synchronous pattern prestored in a built-in register or an external register.

If the data stream is in the MP3 format, for example, the synchronous pattern detection section 42 compares the synchronous pattern "0xfff" which is prestored in the built-in memory with a bit pattern of the data stream input from the interface section 40, and detects a bit pattern which coincides with the prestored bit pattern as a synchronous pattern. The synchronous pattern detection section 42 also extracts data concerning the frame length included in the header frame which is contiguous to the synchronous pattern "0xfff". The synchronous pattern detection section 42, detecting the synchronous pattern as described above, outputs a determination control signal to the synchronization determination section 48.

More specifically, the synchronous pattern detection section 42 extracts a bit rate and a padding bit stored in the predetermined number of bits following the synchronous pattern, and calculates the frame length from these values. The synchronous pattern detection section 42 then sequentially selects one of the registers 44a, 44b, . . . 44n in a cyclic manner and stores information concerning the extracted frame length in the selected register. The synchronous pattern detection section 42 further resets the value of the counter corresponding to the selected register. These processes for storing the frame length value in the selected register and for resetting the counter corresponding to the selected register are performed at a time when processing for reading the frame length data from the registers 44a, 44b, . . . 44n and processing for reading the counter value from the counters 46a, 46b, . . . 46n are completed by the synchronization determination section 48.

The registers 44a, 44b, . . . 44n are storage sections having a memory capacity corresponding to the number of bits of the frame length data in the audio data format. The registers 44a, 44b, . . . 44n, receiving the frame length extracted by the synchronous pattern detection section 42, store and hold the received data. Here, the registers 44a, 44b, . . . 44n may store address information in addition to the frame length data. For example, by storing leading address information of the synchronous pattern, expansion processing and decoding processing to be performed by the decoder 50, which will be described below, can be started immediately.

The counters 46a, 46b, . . . 46n receive the data stream from the synchronization pattern detection section 42 and count the number of bits contained in the data stream from when a reset signal is input thereto by the synchronous pattern detection section 42 until when the next reset signal is input.

More specifically, the register 44a and the corresponding counter 46a are first selected. The synchronous pattern detection section 42, on detecting a synchronous pattern, extracts data concerning the frame length from the data stream following the synchronous pattern, and stores the extracted data in the register 44a. The synchronous pattern detection section 42 further resets the counter value of the corresponding counter 46a to 0. At this time, the synchronous pattern detection section 42 performs the data storage processing with respect to the register 44a and the reset processing with respect to the counter 46a at a time which is after a time at which the synchronization determination section 48 completes the processing for reading the frame length and the counter value as will be described below. The synchronous pattern detection section 42 sequentially selects a pair of the register and the corresponding counter, such as the register 44a and the counter 46a, the register 44b and the counter 46b, . . . and the register 44n and the counter 44n, in a cyclic manner, and performs similar processing each time the synchronous pattern is detected.

The synchronization pattern determination section 48, on receiving a determination control signal from the synchronous pattern detection section 42, reads the data stored in the registers 44a, 44b, . . . 44n and the counter values of the corresponding counters 46a, 46b, . . . 46n, respectively, and stores the data which is read in an internal register. The synchronization determination section 48 then compares, with regard to each pair, the data stored in the register and the counter value of the corresponding counter to determine whether or not appropriate correspondence is obtained.

An example of the comparison processing will be described with regard to the frame length stored in the register 44a and the counter value of the corresponding counter 46a. If the data stream is in a format of MP3, it can be determined that the frame length stored in the register 44a and the counter value of the corresponding counter 46a appropriately correspond to each other if the counter value of the counter 46a coincides with a value obtained by subtracting the number of bits of the synchronous pattern (i.e. "0xfff"=80 bit) from the frame length of 1 frame stored in the register 44. Such comparison processing is to be similarly performed with regard to the data of other registers and the counter values of the corresponding counters.

Here, if no data concerning the frame length has yet been stored in any of the registers 44a, 44b, . . . 44n, comparison processing will not be performed with regard to such a register with no frame length data.

Figure 3:
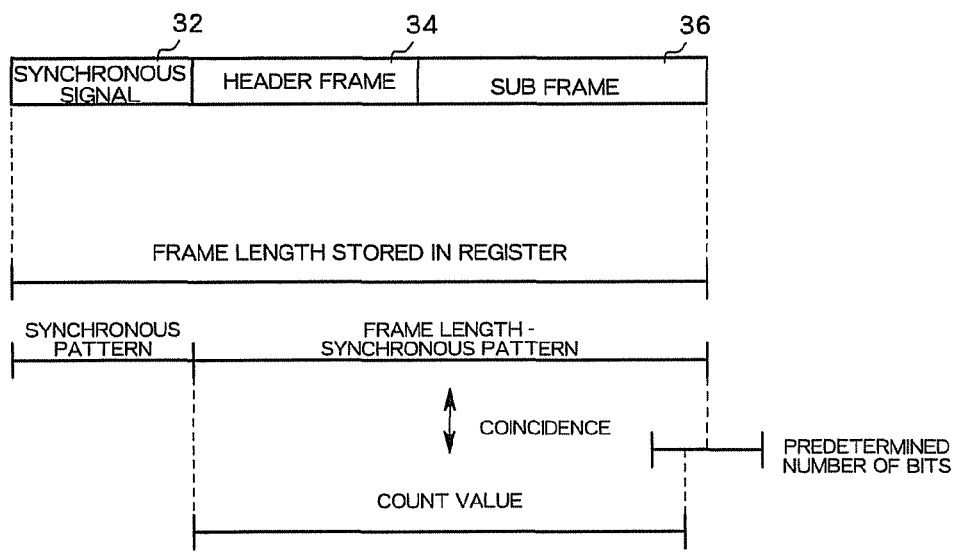
FIG. 3 is a view for explaining a synchronization determination processing according to the embodiment of the present invention.
Figure 4:
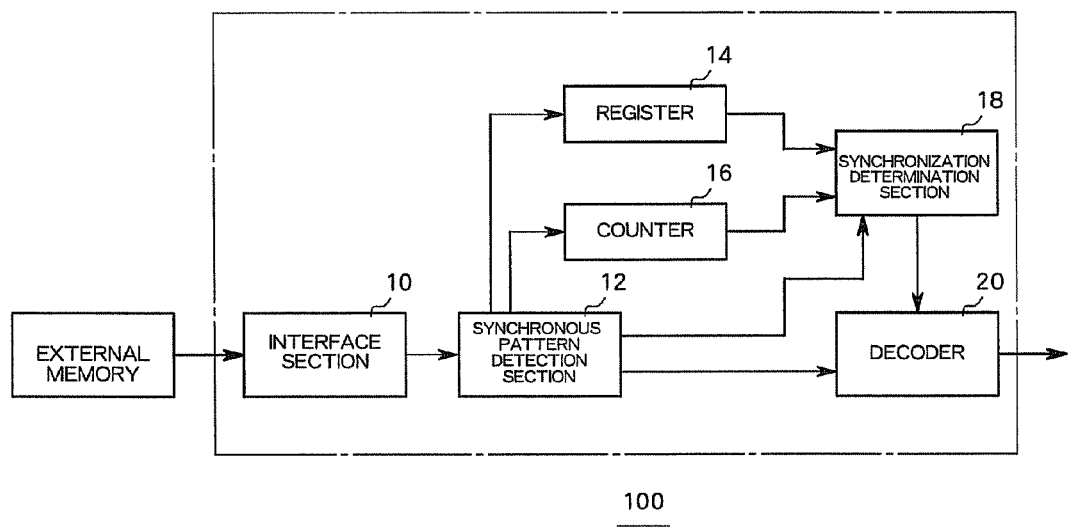
FIG. 4 is a view showing a structure of a data player in related art.
Figure 5:
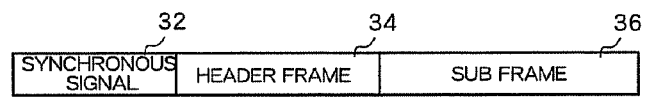
FIG. 5 is a view showing a structure of a frame of data in a MP3 format.
Figure 6:
FIG. 6 is a view showing a structure of a data stream of audio data.

Further, if there is a possibility that an error such as bit dropout is caused in the bit number counting operation performed by the counter 36, it may be determined that the frame length stored in the register 44a and the counter value of the corresponding counter 46a appropriately correspond to each other as long as the counter value of the counter 46a falls within an error range defined by a predetermined number of bit differences with respect to the value obtained by subtracting the number of bits of the synchronous pattern (i.e. "0xfff"=80 bit) from the frame length stored in the register 44a, as shown in FIG. 3.

As such, the synchronization detection section 48 can determine that the bit pattern detected by the synchronous pattern detection section 48 is a correct synchronous pattern when difference values between the frame lengths stored in a plurality of registers and the bit length of the reference synchronous pattern fall within a range of predetermined bit numbers with respect to the counter values of a plurality of corresponding counters.

The synchronization determination section 48 outputs a synchronization setting signal to the decoder 50 when it is determined that the frame length stored in at least one register and the counter value of the corresponding counter appropriately correspond to each other, and outputs no synchronization setting signals to the decoder 50 at other times.

As described above, by providing a plurality of pairs of a register and a counter, it is possible to determine whether or not the frame length which is extracted with regard to each synchronous pattern detected in the data stream coincides with the number of bits counted by the counter until the next synchronous pattern is detected, by tracing in the number of times corresponding to the number of the pairs. Consequently, even when a bit pattern which coincides with a synchronous pattern by chance is included in the sub frame 36 or the like, detection of a correct synchronous pattern can be performed more speedily than by conventional data player.

The decoder 50 receives audio data which is encoded and compressed in a predetermined format from the synchronous pattern detection section 42 and then expands and decodes the received audio data in accordance with the format. Here, while MP3 has been described as an example audio data format in the present embodiment, other formats including AAC, for example, may also be considered. For performing decoding processing such as expansion and decoding, the decoder 50 obtains the leading bit of each frame of the data stream in synchronism with the time at which a synchronization setting signal is input from the synchronization determination section 48.

As described above, according to the data player 200 of the present embodiment, a synchronous pattern included in the data stream can be detected promptly with higher precision. Consequently, processing with regard to the data stream can be started more swiftly.

In particular, as the data length of a synchronous pattern is relatively short in the compressed audio data format which is adopted in the present embodiment, it is highly possible that a bit pattern which is the same as the synchronous pattern will exist in the data stream by chance and an erroneous synchronous pattern will be detected. Accordingly, with the conventional data player 100 described above, a long period of time has been required for detecting a correct synchronous pattern. According to the embodiment of the present invention, on the other hand, a correct synchronous pattern can be detected speedily with high precision, even when an erroneous synchronous pattern is included in the data stream.

While the preferred embodiment of the present invention has been described using specific terms, such description is for illustrative purposes only, and it is to be understood that changes and variations may be made without departing from the spirit or scope of the appended claims.

What is claimed is:

1. A data player comprising:
    a synchronous pattern detection section that checks coincidence between a predetermined reference synchronous pattern and a bit pattern included in a data stream, and, each time the bit pattern which coincides with predetermined reference synchronous pattern is detected, extracts a frame length of a data frame corresponding to the bit pattern which is detected, the extracted frame length being stored in a storage section;
    a synchronization determination section that determines, each time the bit pattern which coincides with predetermined reference synchronous pattern is detected, whether or not the bit pattern detected by the synchronous pattern detection section is a correct synchronous pattern, based on a plurality of frame lengths stored in the storage section and a bit length of a data stream which is obtained after detection of the bit pattern;
    a plurality of registers; and
    a plurality of counters corresponding to the plurality of registers, respectively, the plurality of counters counting a number of bits of a data stream;
    wherein the synchronous pattern detection section, each time the bit pattern which coincides with predetermined reference synchronous pattern is detected, stores the frame length which is extracted with regard to the detected bit pattern in a register which is cyclically selected from the plurality of registers, and the synchronization determination section, each time the bit pattern which coincides with predetermined reference synchronous pattern is detected, determines whether or not the bit pattern detected by the synchronous pattern detection section is a correct synchronous pattern based on the frame length stored in a register and a counter value of a counter corresponding to the register.

2. The data player according to claim 1, wherein the synchronization determination section determines that the bit pattern detected by the synchronous pattern detection section is a correct synchronous pattern, when difference values between frame lengths stored in the plurality of registers and a bit length of predetermined reference synchronous pattern fall within a range of predetermined numbers of bits with respect to counter values of the plurality of counters corresponding to the plurality of registers.

3. The data player according to claim 1, comprising:
a signal processing section that performs predetermined processing with respect to the data stream,
wherein the signal processing section performs the predetermined processing in accordance with a result of determination performed by the synchronization determination section.

4. The data player according to claim 3, wherein the data stream is a data stream of compressed audio data, and
the predetermined processing performed by the signal processing section is expansion or decoding of the compressed audio data.

5. A data play method comprising:
checking coincidence between a predetermined reference synchronous pattern and a bit pattern included in a data stream;
each time the bit pattern which coincides with predetermined reference synchronous pattern is detected, extracting a frame length of a data frame corresponding to the bit pattern which is detected and storing the extracted frame length in a storage section; and
each time the bit pattern which coincides with predetermined reference synchronous pattern is detected, determining whether or not the detected bit pattern is a correct synchronous pattern, based on a plurality of frame lengths stored in the storage section and a bit length of a data stream which is obtained after detection of the bit pattern
each time the bit pattern which coincides with predetermined reference synchronous pattern is detected, storing the frame length which is extracted with regard to the detected bit pattern in a register which is cyclically selected from a plurality of registers; and
each time the bit pattern which coincides with predetermined reference synchronous pattern is detected, determining whether or not the detected bit pattern is a correct synchronous pattern based on the frame length stored in a register and a counter value of a counter corresponding to the register.

* * * * *